US008111262B2

(12) United States Patent
Djordjev et al.

(10) Patent No.: US 8,111,262 B2
(45) Date of Patent: Feb. 7, 2012

(54) INTERFEROMETRIC MODULATOR DISPLAYS WITH REDUCED COLOR SENSITIVITY

(75) Inventors: Kostadin Djordjev, San Jose, CA (US); Kasra Khazeni, San Jose, CA (US); Alok Govil, Santa Clara, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1028 days.

(21) Appl. No.: 11/750,891

(22) Filed: May 18, 2007

(65) Prior Publication Data
US 2008/0288225 A1    Nov. 20, 2008

(51) Int. Cl.
G09G 5/02    (2006.01)
(52) U.S. Cl. .......................................... 345/589; 359/290
(58) Field of Classification Search .................. 345/589; 359/290
See application file for complete search history.

(56) References Cited

U.S. PATENT DOCUMENTS

| | | | |
|---|---|---|---|
| 3,037,189 | A | 5/1962 | Barrett et al. |
| 3,210,757 | A | 10/1965 | Jacob |
| 3,955,190 | A | 5/1976 | Teraishi |
| 5,062,689 | A | 11/1991 | Koehler |
| 5,315,370 | A | 5/1994 | Bulow |
| 5,499,037 | A | 3/1996 | Nakagawa et al. |
| 5,686,979 | A | 11/1997 | Weber et al. |
| 5,786,927 | A | 7/1998 | Greywall et al. |
| 5,815,141 | A | 9/1998 | Phares |
| 5,905,482 | A | 5/1999 | Hughes et al. |
| 5,933,183 | A | 8/1999 | Enomoto et al. |
| 6,028,690 | A | 2/2000 | Carter et al. |
| 6,040,937 | A | 3/2000 | Miles |
| 6,100,861 | A | 8/2000 | Cohen et al. |
| 6,285,424 | B1 | 9/2001 | Yoshida |
| 6,339,417 | B1 | 1/2002 | Quanrud |
| 6,356,378 | B1 | 3/2002 | Huibers |
| 6,377,233 | B2 | 4/2002 | Colgan et al. |
| 6,417,868 | B1 | 7/2002 | Bock |
| 6,574,033 | B1 | 6/2003 | Chui et al. |
| 6,650,455 | B2 | 11/2003 | Miles |
| 6,674,562 | B1 | 1/2004 | Miles et al. |
| 6,680,792 | B2 | 1/2004 | Miles |
| 6,813,059 | B2 | 11/2004 | Staker et al. |
| 6,822,780 | B1 | 11/2004 | Long |

(Continued)

FOREIGN PATENT DOCUMENTS
EP    0 361 981    4/1990
(Continued)

OTHER PUBLICATIONS

PCT International Search Report and Written Opinion, for International Application No. PCT/US2008/062788, mailed Sep. 19, 2008.

(Continued)

*Primary Examiner* — Javid Amini
(74) *Attorney, Agent, or Firm* — Knobbe Martens Olson & Bear LLP

(57) ABSTRACT

Methods are described for selecting reflective layer distances in an interferometric modulator display that result in reduced color sensitivity to temperature and process variation. Colors are selected for interferometric modulator subpixels that correspond to a minimum in the rate that the colors change with respect to reflective layer distance. In some cases, colors are selected that deviate from the minimums in order to obtain a desired target color (e.g., a desired white point).

43 Claims, 11 Drawing Sheets

U.S. PATENT DOCUMENTS

| | | | |
|---|---|---|---|
| 6,849,471 B2 | 2/2005 | Patel et al. | |
| 6,867,896 B2 | 3/2005 | Miles | |
| 6,882,458 B2 | 4/2005 | Lin et al. | |
| 6,912,022 B2 | 6/2005 | Lin et al. | |
| 6,913,942 B2 | 7/2005 | Patel et al. | |
| 6,980,350 B2 | 12/2005 | Hung et al. | |
| 6,982,820 B2 | 1/2006 | Tsai | |
| 7,006,272 B2 | 2/2006 | Tsai | |
| 7,119,945 B2 | 10/2006 | Kothari et al. | |
| 7,123,216 B1 | 10/2006 | Miles | |
| 7,126,738 B2 | 10/2006 | Miles | |
| 7,161,728 B2 | 1/2007 | Sampsell et al. | |
| 7,184,202 B2* | 2/2007 | Miles et al. | 359/321 |
| 7,205,722 B2 | 4/2007 | Koshio et al. | |
| 7,250,930 B2 | 7/2007 | Hoffman et al. | |
| 7,289,259 B2* | 10/2007 | Chui et al. | 359/291 |
| 7,310,179 B2* | 12/2007 | Chui et al. | 359/290 |
| 7,321,456 B2* | 1/2008 | Cummings | 359/290 |
| 7,359,066 B2* | 4/2008 | Cummings et al. | 356/519 |
| 7,369,294 B2* | 5/2008 | Gally et al. | 359/260 |
| 7,369,296 B2* | 5/2008 | Floyd | 359/290 |
| 7,372,613 B2 | 5/2008 | Chui et al. | |
| 7,388,704 B2* | 6/2008 | Djordjev | 359/247 |
| 7,417,735 B2* | 8/2008 | Cummings et al. | 356/408 |
| 7,486,429 B2* | 2/2009 | Chui | 359/290 |
| 7,527,998 B2 | 5/2009 | Tung et al. | |
| 7,532,381 B2 | 5/2009 | Miles et al. | |
| 7,567,373 B2* | 7/2009 | Chui et al. | 359/291 |
| 7,612,932 B2* | 11/2009 | Chui et al. | 359/290 |
| RE42,119 E | 2/2011 | Chui et al. | |
| 7,898,725 B2 | 3/2011 | Sampsell | |
| 2001/0003487 A1 | 6/2001 | Miles | |
| 2001/0028503 A1 | 10/2001 | Flanders et al. | |
| 2001/0055208 A1 | 12/2001 | Kimura | |
| 2002/0024711 A1 | 2/2002 | Miles | |
| 2002/0051281 A1 | 5/2002 | Ueda et al. | |
| 2002/0054424 A1 | 5/2002 | Miles | |
| 2002/0070931 A1 | 6/2002 | Ishikawa | |
| 2002/0075555 A1 | 6/2002 | Miles | |
| 2002/0126364 A1 | 9/2002 | Miles | |
| 2002/0149828 A1 | 10/2002 | Miles | |
| 2002/0154422 A1 | 10/2002 | Sniegowski et al. | |
| 2002/0186209 A1 | 12/2002 | Cok | |
| 2003/0035196 A1 | 2/2003 | Walker | |
| 2003/0043157 A1 | 3/2003 | Miles | |
| 2003/0072070 A1 | 4/2003 | Miles | |
| 2004/0100677 A1 | 5/2004 | Huibers et al. | |
| 2004/0184766 A1 | 9/2004 | Kim et al. | |
| 2005/0036095 A1 | 2/2005 | Yeh et al. | |
| 2005/0069209 A1 | 3/2005 | Damera-Venkata et al. | |
| 2005/0122294 A1 | 6/2005 | Ben-David et al. | |
| 2005/0195462 A1 | 9/2005 | Lin | |
| 2005/0202649 A1 | 9/2005 | Hung et al. | |
| 2006/0024880 A1 | 2/2006 | Chui et al. | |
| 2006/0065940 A1 | 3/2006 | Kothari | |
| 2006/0066543 A1* | 3/2006 | Gally et al. | 345/85 |
| 2006/0066599 A1 | 3/2006 | Chui | |
| 2006/0066640 A1 | 3/2006 | Kothari et al. | |
| 2006/0066856 A1* | 3/2006 | Cummings et al. | 356/402 |
| 2006/0066935 A1 | 3/2006 | Cummings et al. | |
| 2006/0067643 A1 | 3/2006 | Chui | |
| 2006/0067649 A1 | 3/2006 | Tung et al. | |
| 2006/0067651 A1 | 3/2006 | Chui | |
| 2006/0077148 A1* | 4/2006 | Gally et al. | 345/85 |
| 2006/0077152 A1 | 4/2006 | Chui et al. | |
| 2006/0077156 A1 | 4/2006 | Chui et al. | |
| 2006/0077507 A1* | 4/2006 | Chui et al. | 359/245 |
| 2006/0077508 A1 | 4/2006 | Chui et al. | |
| 2006/0077514 A1* | 4/2006 | Sampsell | 359/290 |
| 2006/0077515 A1* | 4/2006 | Cummings | 359/290 |
| 2006/0077516 A1 | 4/2006 | Kothari | |
| 2007/0077525 A1 | 4/2007 | Davis et al. | |
| 2007/0086078 A1 | 4/2007 | Hagood et al. | |
| 2007/0205969 A1 | 9/2007 | Hagood et al. | |
| 2007/0229936 A1 | 10/2007 | Miles | |
| 2007/0253054 A1 | 11/2007 | Miles | |
| 2007/0268211 A1 | 11/2007 | Whitehead et al. | |
| 2007/0290961 A1 | 12/2007 | Sampsell | |
| 2008/0003737 A1 | 1/2008 | Tung et al. | |
| 2008/0013144 A1* | 1/2008 | Chui et al. | 359/224 |
| 2008/0037093 A1 | 2/2008 | Miles | |
| 2008/0055705 A1 | 3/2008 | Kothari | |
| 2008/0055706 A1 | 3/2008 | Chui et al. | |
| 2008/0080043 A1* | 4/2008 | Chui et al. | 359/318 |
| 2008/0088904 A1 | 4/2008 | Miles | |
| 2008/0088911 A1 | 4/2008 | Miles | |
| 2008/0088912 A1 | 4/2008 | Miles | |
| 2008/0106782 A1 | 5/2008 | Miles | |
| 2008/0110855 A1 | 5/2008 | Cummings | |
| 2008/0112035 A1 | 5/2008 | Cummings | |
| 2008/0112036 A1* | 5/2008 | Cummings | 359/290 |
| 2008/0151353 A1 | 6/2008 | Haskett | |
| 2009/0022884 A1* | 1/2009 | Chui et al. | 427/97.3 |
| 2009/0103168 A1 | 4/2009 | Sampsell | |
| 2009/0135465 A1 | 5/2009 | Chui | |
| 2009/0231496 A1 | 9/2009 | Nishino et al. | |
| 2009/0279162 A1 | 11/2009 | Chui | |
| 2011/0019380 A1 | 1/2011 | Miles | |
| 2011/0038027 A1 | 2/2011 | Miles | |

FOREIGN PATENT DOCUMENTS

| | | |
|---|---|---|
| EP | 1 439 515 | 7/2004 |
| EP | 1 640 314 | 3/2006 |
| EP | 1 640 314 A2 A2 | 3/2006 |
| JP | 2003-315732 | 11/2003 |
| KR | 2002-010322 | 2/2002 |
| WO | WO 97/17628 | 5/1997 |
| WO | WO 97/17628 A1 | 5/1997 |
| WO | WO 99/52006 | 10/1999 |
| WO | WO 02/063602 | 8/2002 |
| WO | WO 02/071132 | 9/2002 |
| WO | WO 2004/042687 | 5/2004 |
| WO | WO 2005/010566 | 2/2005 |
| WO | WO 2005/093488 | 10/2005 |
| WO | WO 2005/093488 A1 | 10/2005 |

OTHER PUBLICATIONS

ISR and WO for PCT/US08/062788, filed May 6, 2008.

Pape et al., Characteristics of the deformable mirror device for optical information processing, Optical Engineering, 22(6):676-681, Nov.-Dec. 1983.

IPRP for PCT/US08/062788, dated Aug. 31, 2009.

* cited by examiner

INTERFEROMETRIC MODULATOR DISPLAYS WITH REDUCED COLOR SENSITIVITY

FIELD OF THE INVENTION

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

One embodiment disclosed herein includes a method of selecting a distance between two reflective surfaces for each one of multiple interferometric modulators for use in a display, the method including determining first distances between the two reflective surfaces in each one of the multiple interferometric modulators where the rate of change of color reflected from the multiple interferometric modulators as a function of distance is a local minimum, determining the color of light that would be reflected from the display when substantially all interferometric modulators in the display are in a bright state, and if the color is not substantially close to a desired target color, determining second distances between the two reflective surfaces for each one of the multiple interferometric modulators by varying the first distances until the color of light that would be reflected from the display when substantially all interferometric modulators in the display are in a bright state is substantially close to the desired target color.

Another embodiment disclosed herein includes a method of selecting colors for an interferometric modulator display, the method including determining a color for at least one interferometric modulator for which the rate of change of the color with respect to distance between reflective surfaces in the interferometric modulator is a local minimum and varying the color so that a certain color reflected from the display is substantially close to a desired target color.

Another embodiment disclosed herein includes a computer-readable medium comprising computer-executable instructions for performing the method comprising determining a color for at least one interferometric modulator for which the rate of change of the color with respect to distance between reflective surfaces in the interferometric modulator is a local minimum and varying the color so that a certain color reflected from the display is substantially close to a desired target color.

Another embodiment disclosed herein includes a method of manufacturing an interferometric modulator display, including selecting distances between reflective surfaces in each interferometric modulator by: 1) determining first distances between two reflective surfaces in each interferometric modulator where the rate of change of color reflected from each interferometric modulator as a function of distance is a local minimum, 2) determining the color of light that would be reflected from the display when substantially all interferometric modulators in the display are in a bright state, and 3) if the color is not substantially close to a desired target color, determining second distances between the two reflective surfaces for each interferometric modulator by varying the first distances until the color of light that would be reflected from the display when substantially all interferometric modulators in the display are in a bright state is substantially close to the desired target color and finally, manufacturing an array of interferometric modulators having the selected distances.

Another embodiment disclosed herein includes an interferometric modulator display, comprising at least one interferometric modulator having a bright state color within 0.04 units in u'-v' color space of a color at which the rate of change of color with respect to distance between reflective surfaces in the interferometric modulator is a local minimum.

Another embodiment disclosed herein includes a display having first means for reflecting light and second means for reflecting light, wherein the distance between the first and second means is such that light interferometrically reflected from the first and second means has a color within 0.04 units in u'-v' color space of a color at which the rate of change of color with respect to distance between the first and second means is a local minimum.

Another embodiment disclosed herein includes an interferometric modulator display, comprising at least one interferometric modulator having a bright state color that varies less than about 0.03 units in u'-v' color space over a 20° C. temperature change.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some interferometric modulator displays exhibit color sensitivity to changes in temperature or process conditions due to variation in reflective layer distances. Accordingly, in some embodiments, methods and structures are provided that have reduced color sensitivity. In some embodiments, color sensitivity is reduced by selecting reflective layer distances where the rate of change of color with respect to reflective layer distance is minimized. In some embodiments, the color is varied from this distance so that the display is capable of producing a desired target color (e.g., a desired white point).

Figure 1:
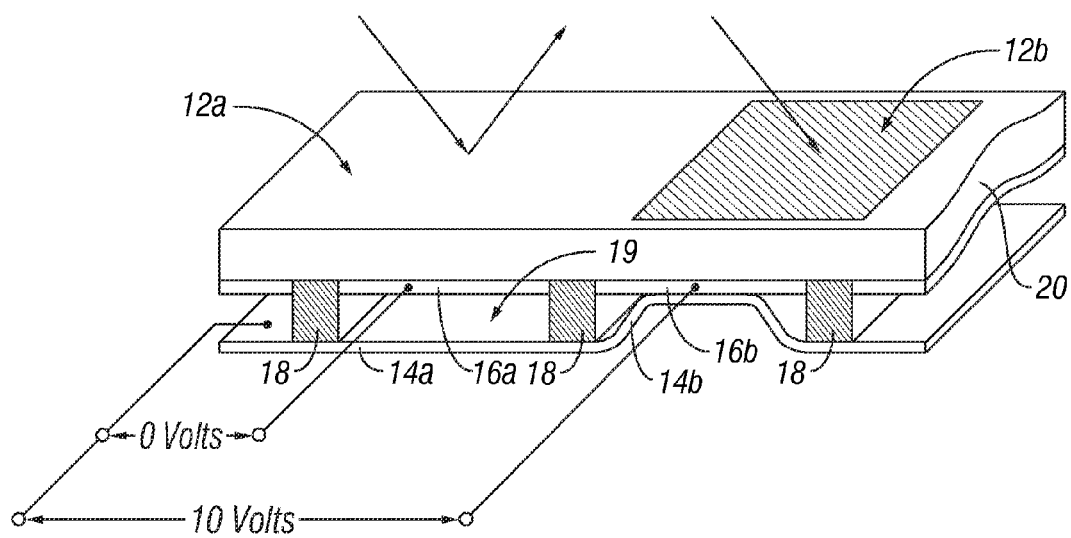
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user.

Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
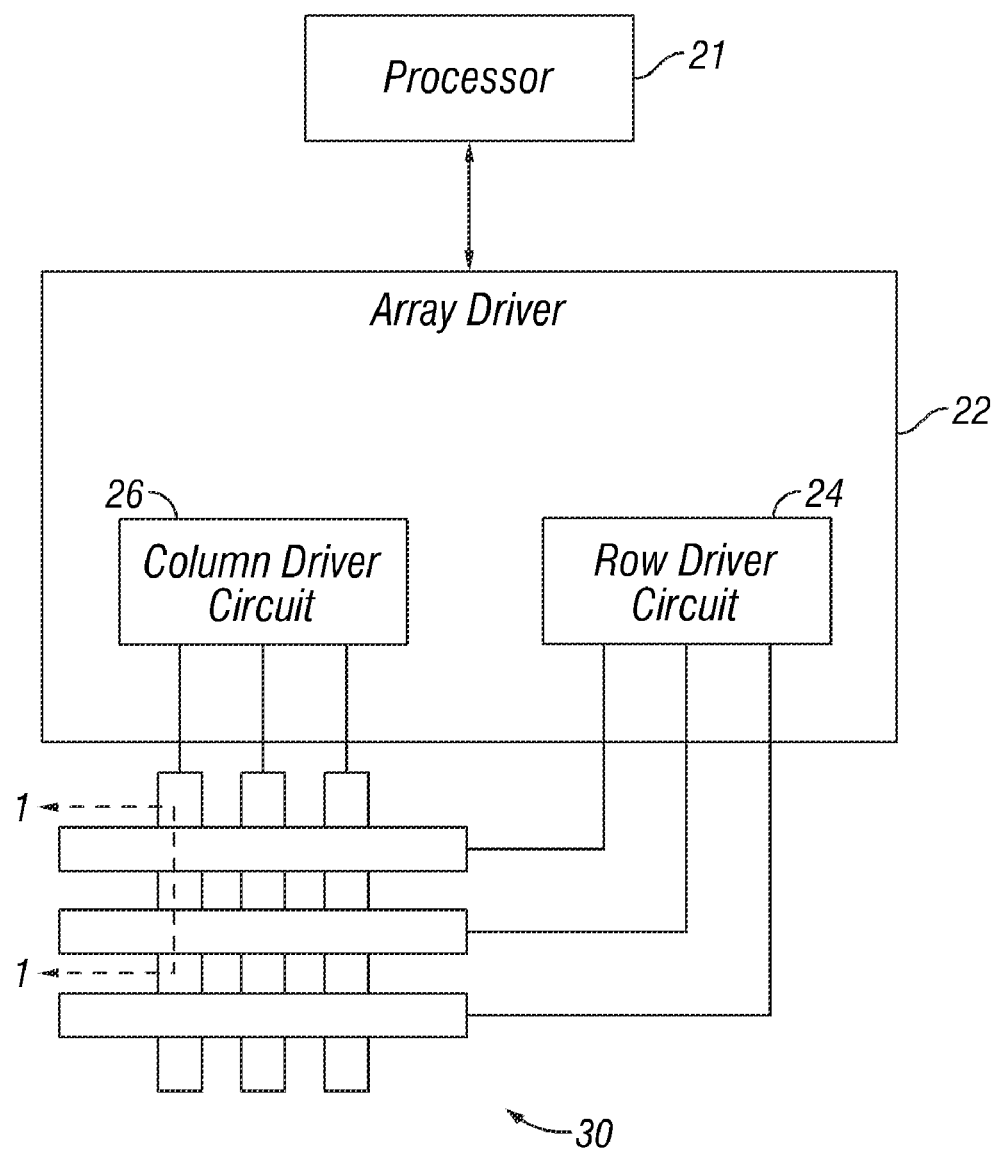
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
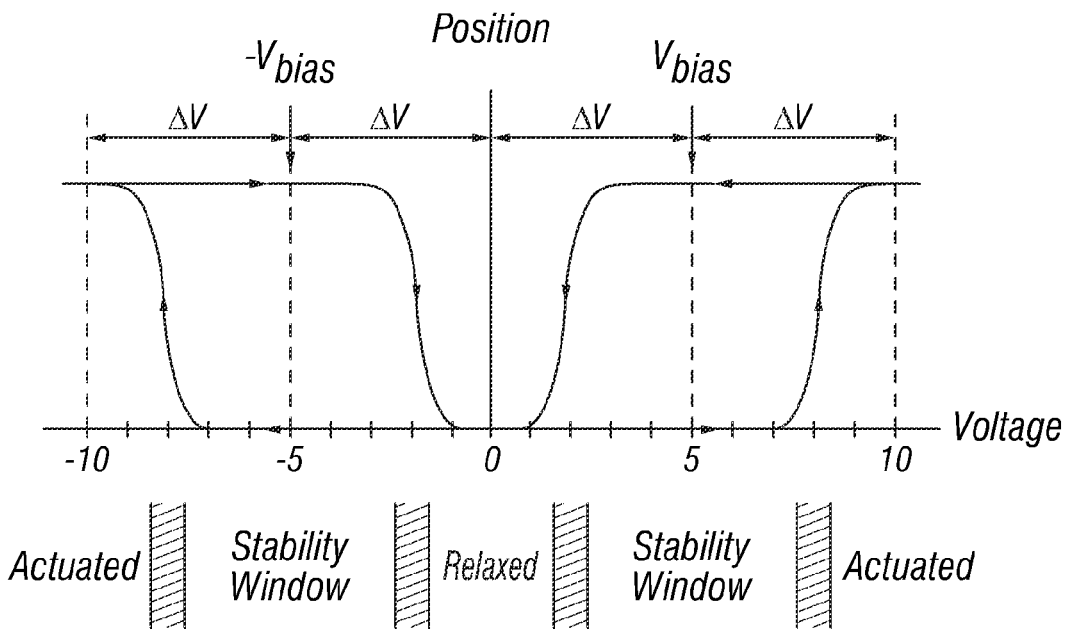
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
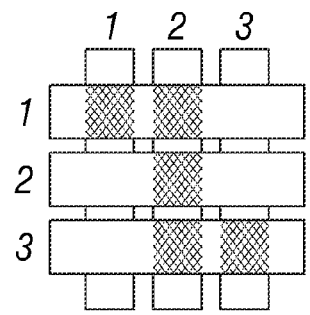
FIGS. 5A and 5B illustrate one exemplary timing diagram for row and column signals that may be used to write a frame of display data to the 3×3 interferometric modulator display of FIG. 2.
Figure 5B:
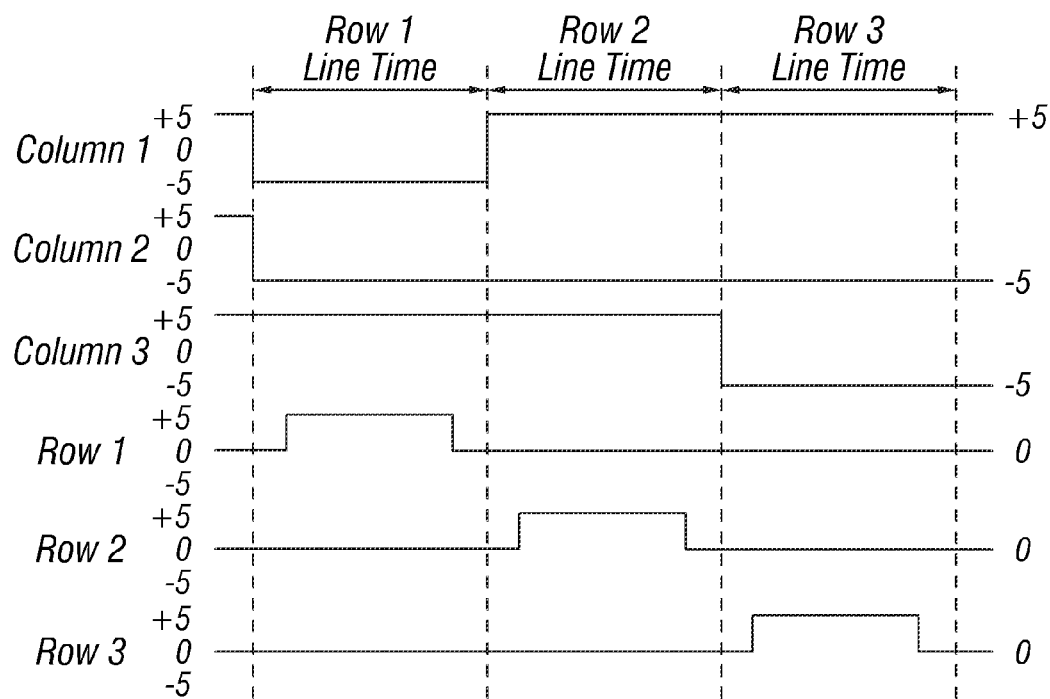

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
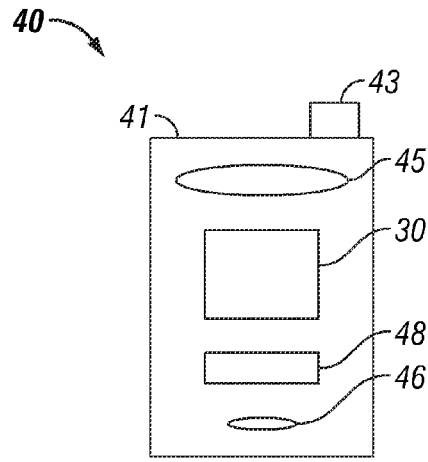
FIGS. 6A and 6B are system block diagrams illustrating an embodiment of a visual display device comprising a plurality of interferometric modulators.
Figure 6B:
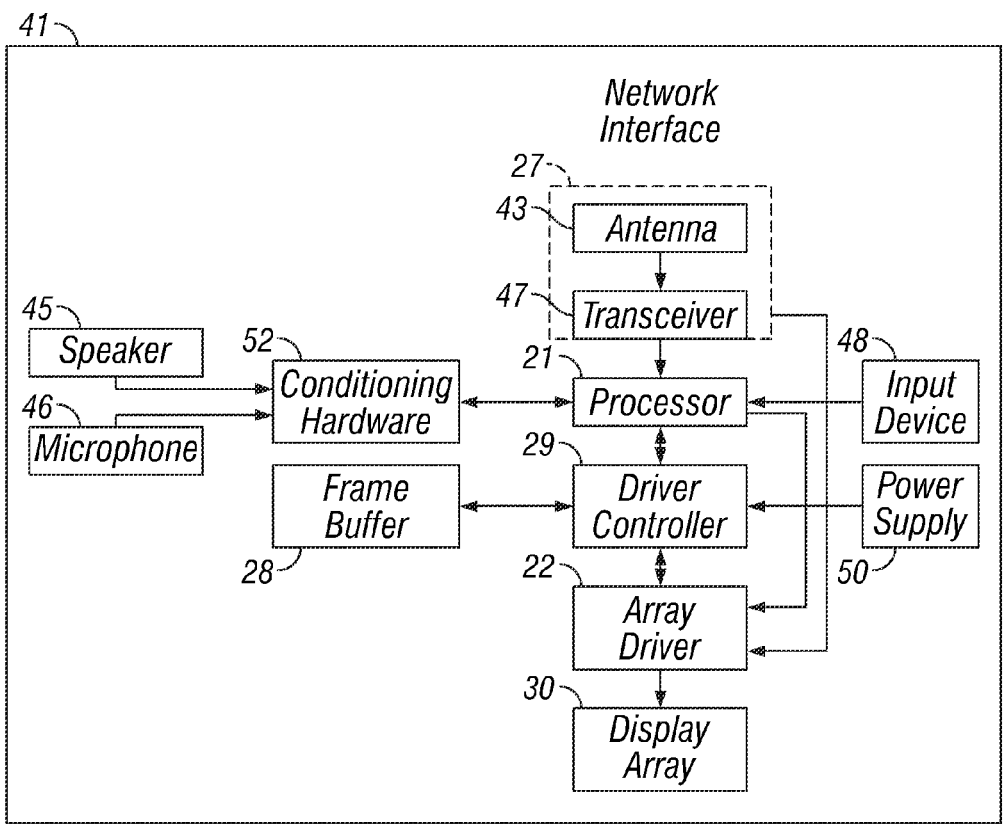

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 preprocesses the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
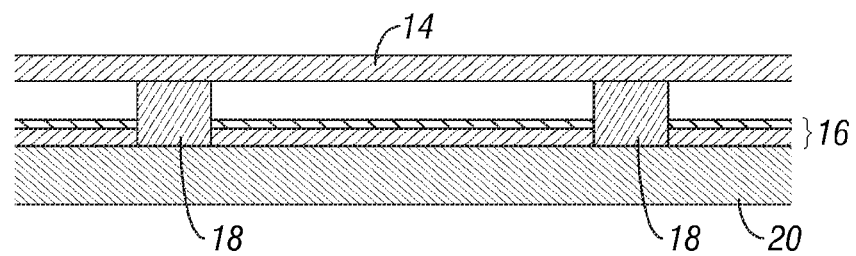
FIG. 7A is a cross section of the device of FIG. 1.
Figure 7B:
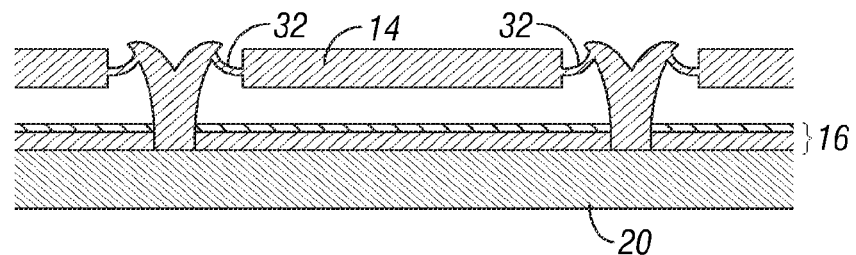
FIG. 7B is a cross section of an alternative embodiment of an interferometric modulator.
Figure 7C:
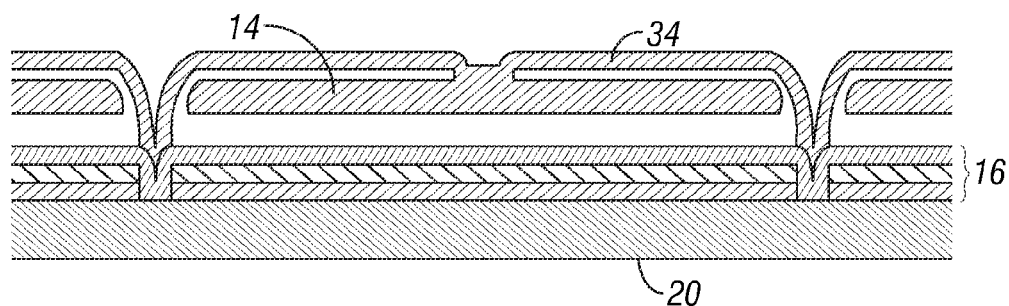
FIG. 7C is a cross section of another alternative embodiment of an interferometric modulator.
Figure 7D:
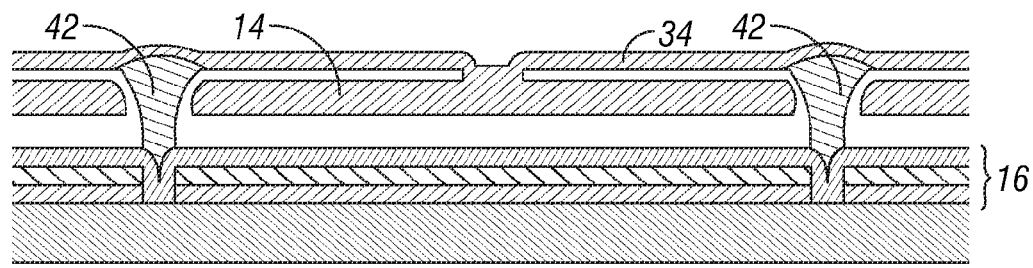
FIG. 7D is a cross section of yet another alternative embodiment of an interferometric modulator.
Figure 7E:
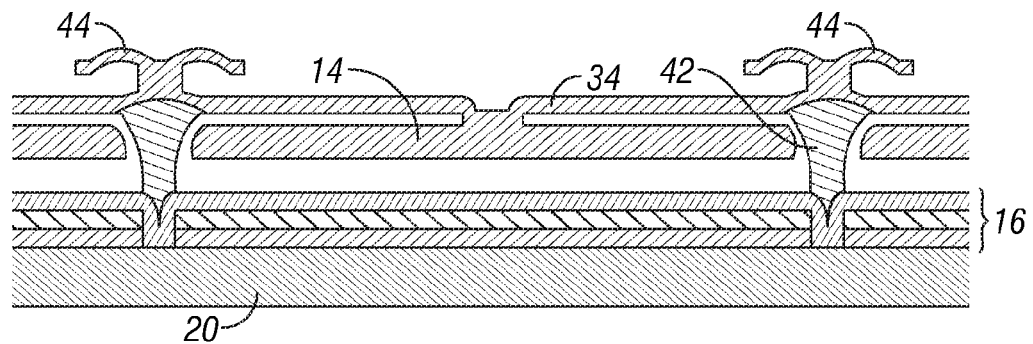
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above, interferometric modulators include a pair of reflective layers positioned at variable and controllable distances from each other to form a resonant optical cavity with at least one variable dimension. The distance between the reflective layers determines whether the interferometric modulator is in a bright or dark state. In the bright state, the interferometric modulator reflects a large portion of incident visible light to a user. When in the dark state, the interferometric modulator reflects little incident visible light to the user. The color of light reflected when the interferometric modulator is in the bright state depends on the distance between the reflective layers (i.e., the size of the optical cavity). Thus, any unintended change in the distance between the reflective layers can result in undesirable changes in the color reflected from the display. For example, environmental variables such as temperature or humidity may result in a change in reflective layer distance from its manufactured state. Temperature variation is of particular concern in some embodiments since the materials used in interferometric modulators may have different coefficients of thermal expansion, resulting in mechanical movement of the mirrors with temperature. In addition, minute variations in process conditions (e.g., resulting in a change in a material layer thickness) may result in variation in reflective layer distance. Accordingly, in some embodiments, methods and structures are provided to minimize the color sensitivity of an interferometric modulator to variation in reflective layer distances. In addition to providing color stability during use, such a method may result in better production yields during display manufacture (e.g., less displays will fail quality control).

The extent that color reflected from an interferometric modulator changes in response to small undesired changes in reflective layer distance depends on the initial reflective layer distance (and hence initial color). In other words, the color sensitivity depends on the initial color design choice (and hence reflective layer distance design choice) for the interferometric modulators in a display. Accordingly, in some embodiments, minimization of color sensitivity in an interferometric modulator is achieved by selecting a reflective layer distance where a small change in the distance (e.g., such as due to ambient temperature variation) will have little impact on color.

In one embodiment, minimization of color sensitivity is achieved by finding a reflective layer distance where the rate that the reflected color changes as a function of reflective layer distance is a local minimum. The meaning of "local minimum" as used herein is the same as readily understood by one of skill in the art. Specifically, by "local minimum," it is meant that the reflective layer distance is such that any small increase or decrease in distance from that corresponding to the local minimum will result in an increase in the rate that color changes with respect to distance. However, it is recognized that large changes in reflective layer distance may result in rates of color change that are smaller than the rate at the local minimum. Thus, multiple local minimums may be identified as the reflective layer distance is varied. For example, a local minimum may be identified for reflective layer distances resulting in reflection of substantially red light. However, additional local minimums may be identified for reflective layer distances resulting in reflection of substantially green light and substantially blue light.

In some embodiments, local minima may be identified by measuring or modeling the color parameters of the reflected light as a function of reflective layer distance. As is well understood in the art, perception of color may be quantified using a CIE color space in which tristimulus color parameters may be defined and plotted on a chromaticity diagram. In one embodiment, CIE tri-stimulus values X, Y, and Z are used. In other embodiments, color parameters derived from these tri-stimulus values are used. For example, in various embodiments, the tri-stimulus values are converted to Y, x, y; Y, u', v'; or L*, a*, b* equivalents. These color parameters and methods for determining them are well known in the art.

In one embodiment, color parameters are used to quantify a difference between two colors. For example, a distance dR in CIE color space may be defined as $$dR = \sqrt{(u'_n - u'_{n-1})^2 + (v'_n - v'_{n-1})^2} \quad (1)$$

where $(u'_n, v'_n)$ and $(u'_{n-1}, v'_{n-1})$ represent two different colors in u',v' color space. Similar definitions may be used in alternative color space schemes (i.e., alternative color parameters). If the two different colors (designated by n and n−1) are close to each other in the CIE color space, then a rate of color change with respect to reflective layer distance, $$\frac{dR}{dg},$$

may be defined as $$\frac{dR}{dg} = \frac{\sqrt{(u'_n - u'_{n-1})^2 + (v'_n - v'_{n-1})^2}}{dg} \quad (2)$$

where dg is the difference in reflective layer distance in an interferometric modulator reflecting light having the color $(u'_n, v'_n)$ and reflecting light having the color $(u'_{n-1}, v'_{n-1})$. This rate of change is a measure of the color sensitivity of an interferometric modulator having a reflective layer distance g and reflecting the color $(u'_n, v'_n)$. Thus, determining the local minima of equation (2) will indicate the colors (and hence reflective layer distances) having the lowest color sensitivity to reflective layer distance changes.

The above rate-of-change function may be determined over a range of reflective layer distances either through experimentation or modeling. For example, in one embodiment, a series of static interferometric modulators having varying reflective layer distances may be manufactured and the resulting color reflection measured. The results from these experiments may be used to identify the reflective layer distances that correspond to local minima in the rate-of-change function. Alternatively, an optical model of the interferometric modulator may be constructed and used to predict the color reflected from the interferometric modulator for various reflective layer distances. For example, the optical properties for each material layer in a proposed interferometric modulator may be provided as input into a full optical model to determine the resulting reflection characteristics. Properties for each material layer input into the model may include thickness of the layer, index of refraction, and extinction coefficient. Local minima may then be determined using mathematical methods.

In some embodiments, color interferometric modulator displays are provided comprising multiple interferometric modulators reflecting different bright-state colors. For example, a display may be provided having red, green, and blue bright-state interferometric modulators (e.g., subpixels). Local minima may be identified for each different subpixel. In some embodiments, a white color is provided by the display by combining the bright-state reflection from all subpixels (e.g., having adjacent red, green, and blue subpixels in a bright state). However, in some cases, the local minimum for each subpixel corresponds to colors whose combination does not result in a desired white color. Accordingly, in some embodiments, reflective layer distances are selected for some or all subpixels that differ from the local minima distances. These distances may be selected to still be close the local minima, thereby still minimizing color sensitivity to reflective distance changes. In general, the final choice for reflective layer distances may deviate from the minimums in order to obtain any final result (e.g., to obtain a desired target color or color balance).

Based on the forgoing, in one embodiment, a method is provided for selecting reflective layer distances for interferometric modulators in a display. The method may proceed according the flowchart depicted in FIG. 8. Depending on the particular embodiment, steps may be added to those depicted in the flowcharts herein or some steps may be removed. In addition, the order of steps may be rearranged depending on the application. At block 100, the rate of change of color with respect to reflective layer distances are determined for one or more interferometric modulators. As discussed above, this rate of change may be determined experimentally or by using an optical model as part of an algorithm. The rate of change may be expressed using any suitable color parameter scheme, such as is described above. For displays intended to have multiple color subpixels, the rate of change may be determined for each subpixel by varying the reflective layer distance over a limited range (e.g., 100 nm) in which the desired color is reflected. For example, for a red subpixel in one interferometric modulator design, the rate of color change may be determined for reflective layer distances ranging from 195 nm to 295 nm, since these distances will encompass the possible shades of red available to the interferometric modulator. By limiting the range over which rates of color change are determined to only those reflective layer distances near the desired subpixel colors, the time required to determine local minima is reduced. Alternatively, the rate of color change may be determined over a large range of contiguous reflective layer distances that will encompass all local minima available to the interferometric modulator.

In some embodiments, when the rates of color change are determined over a range of reflective layer distances, the reflective layer distance may be incrementally increased over the range and the rate of change determined for each reflective layer distance evaluated. The change in reflective layer distance for each incremental increase may be any suitable value. In one embodiment, the reflective layer distances are increased in 1 nm increments. When the rate of color change is determined using an algorithm that includes optical models, the rate of color change may be determined for all subpixels simultaneously. For example, a single parameter termed "launch" may be defined such that varying the launch in the algorithm will simultaneously vary the reflective layer distances of all the subpixels. For example, for a display having red, green, and blue subpixels, the subpixel reflective layer distance may be defined as launch+195 nm (red), launch+132 nm (green), or launch+330 nm (blue). The launch may be incremented by a desired step size (e.g., 1 nm) from 0 nm to some maximum upper limit (e.g., 100 nm).

Figure 8:
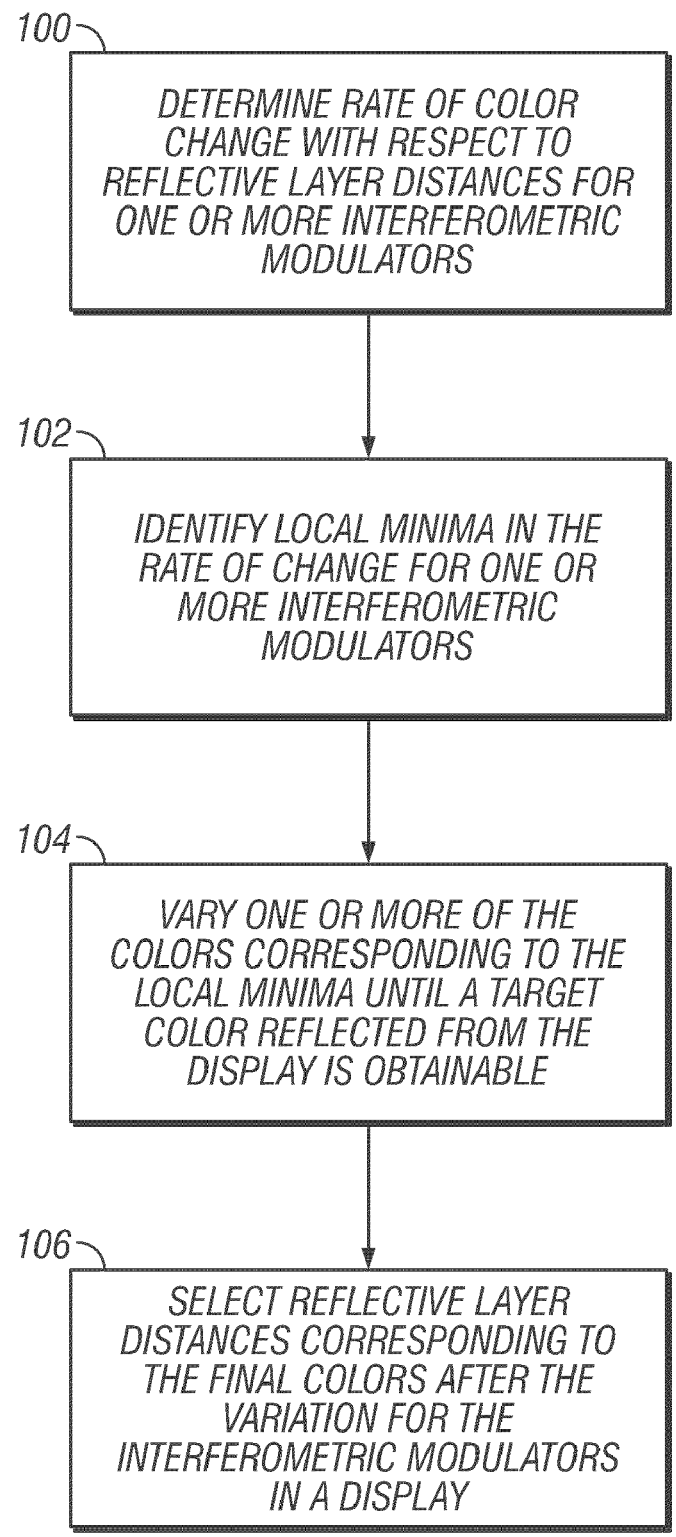
FIG. 8 is a flowchart depicting a method for selecting reflective layer distances in an interferometric modulator display.

Returning to FIG. 8, at block 102 the rates of color change as a function of reflective layer distances determined at block 100 are evaluated to identify the local minimum for each subpixel. For example, the entire range of color change rate determined for the red subpixel (e.g., corresponding to reflective layer distances from 195 nm to 295 nm) may be evaluated to determine the local minimum appearing in the part of the color space corresponding to red colors. In some embodiments, the local minima may be determined after the rates of color change are determined for all subpixels. In embodiments where the rates of color change are determined separately for each subpixel, the local minima may alternatively be determined immediately after determining the rates of color change such that the steps corresponding to blocks 100 and 102 in FIG. 8 are sequentially repeated for each subpixel.

If the color performance of the display would be satisfactory using the colors corresponding to the local minima identified at block 102, the process may terminate. Alternatively, one or more of the colors corresponding to the local minima may be varied away from the local minima at block 104 to obtain a more desirable result. For example, as discussed above, in one embodiment, one or more of the colors are varied until a certain color (e.g., the color obtained when multiple pixels are in a bright state) is substantially close to a desired target color. For example, one or more of the colors may be varied until the combination of the color from all subpixels would correspond to a desired white color (e.g., D65 standard white). In one embodiment, each subpixel color is varied less than about 0.04, 0.03, or 0.02 units in u',v' color space from the local minimum color. The variation of the colors may be accomplished by any suitable method. In one embodiment, the color corresponding to each minimum is incrementally increased or decreased until the desired result is obtained. A user may manually perform the increase or decrease or a computational algorithm may be used that iteratively varies the colors to obtain a desired result. In some embodiments, a balance is maintained between having the final colors be close to the local minima and achieving the desired color performance. Once the final subpixel colors are determined, the reflective layer distances corresponding to the final colors are selected at block 106 for use in a display. The display may then be manufactured such that the bright-state reflective layer distances in the interferometric modulators will correspond to the selected reflective layer distances.

A potential advantage is that in some embodiments, the above method results in a display having low color sensitivity to temperature change. For example, in various embodiments, a display is provided having interferometric modulators whose bright-state colors vary less than about 0.03, 0.02, or 0.01 units in u',v' color space upon a 20° C. temperature change.

In some embodiments, one or more of the methods and algorithms described above are coded and packaged into a software design tool, providing a display designer tools for selecting optimal colors for an interferometric modulator display. For example, the method may be encoded as instructions for controlling a computer on a computer readable medium such as a compact disc or a computer hard drive. In some embodiments, a graphical user interface may be provided to facilitate implementation of the method.

Example

The colors chosen for the subpixels in an interferometric modulator display utilizing red, green, and blue subpixels were optimized to reduce the sensitivity of color to temperature change. When optimizing the colors according to the methods described herein, any suitable starting point may be used. In this example, the original reflective layer distances in the subpixels were 245 nm for red, 182 nm for green, and 380 nm for blue since these values had otherwise provided satisfactory display characteristics (e.g., color gamut, brightness, and contrast ratio). A full optical model of the interferometric modulator was constructed that provided u',v' color parameters for a given reflective layer distance. A launch parameter was defined such that a single value of the launch parameter would provide three reflective layer distances corresponding to the red, green, and blue subpixels, respectively. Specifically, red subpixel reflective layer distances were determined as launch+195 nm, green subpixel reflective layer distances were determined as launch+132 nm, and blue subpixel reflective layer distances were determined as launch+330 nm. These definitions provided that the original subpixel reflective layer distances corresponded to a launch of 50 nm.

Figure 9:
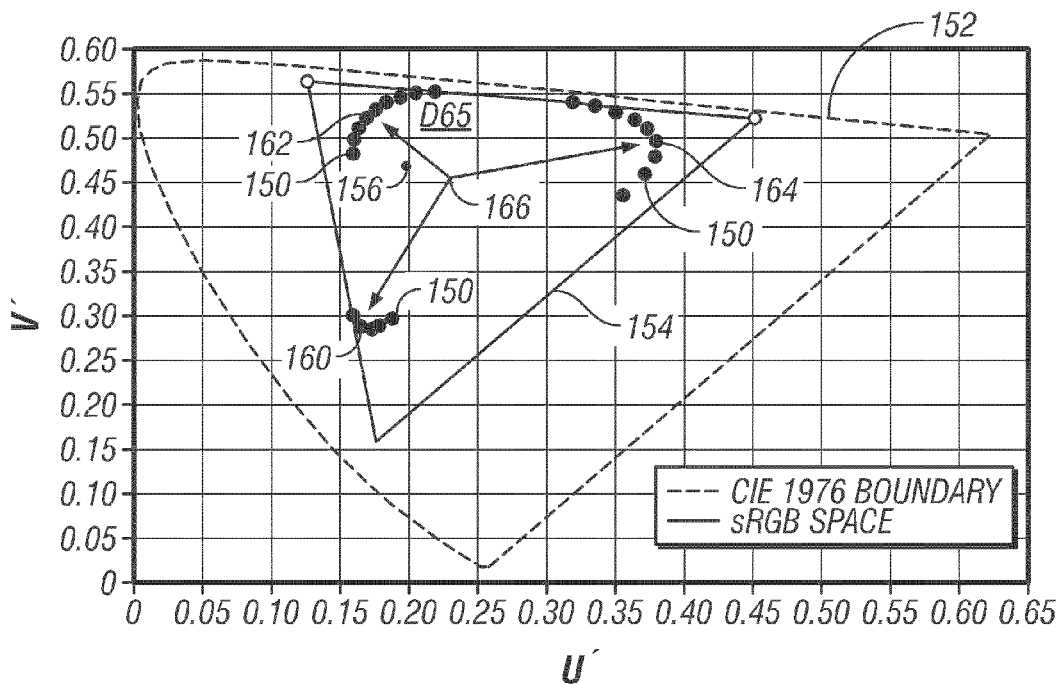
FIG. 9 is a u',v' color space plot depicting various interferometric modulator colors.

The launch was then varied in 1 nm increments from 0 nm to 100 nm. Thus, the reflective layer distances were varied by 50 nm above and below the original distances. For each launch value, the color parameters for the three subpixels were determined. FIG. 9 depicts a u',v' color space showing as a series of points 150 for some of the colors determined for the subpixels. Also shown for reference are the CIE 1976 color boundary 152, the sRGB color boundary 154, and the D65 white point 156. The CIE color boundary 152 is a curved line that starts in the orange section of the diagram and extends to the left and downward until it ends in the desaturated part of the blue region. This line represents the color temperatures of an ideal blackbody radiator. It is sometimes called the blackbody or Planckian locus. A blackbody radiator is a theoretical object that absorbs 100% of the radiation incident thereon while being able to emit the maximum amount of energy possible for a particular temperature. The sRGB boundary 154 is a standard red, green, blue color space designed to match typical home and office viewing conditions.

Figure 10:
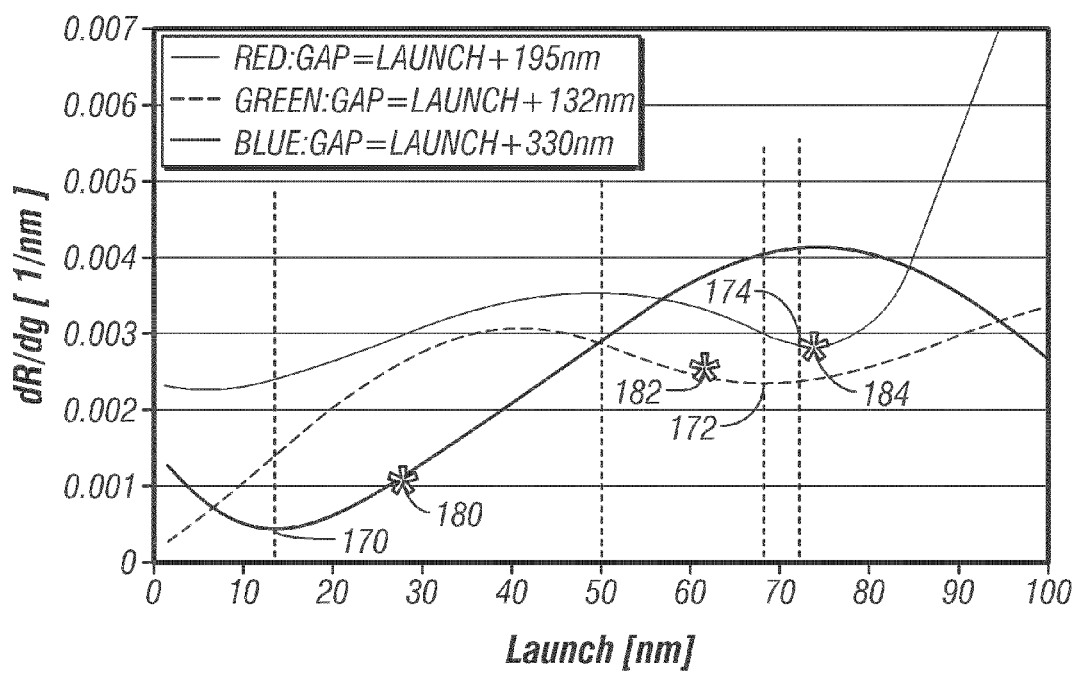
FIG. 10 is a graph of the rate of change of interferometric modulator color as a function of reflective layer distance.
Figure 11:
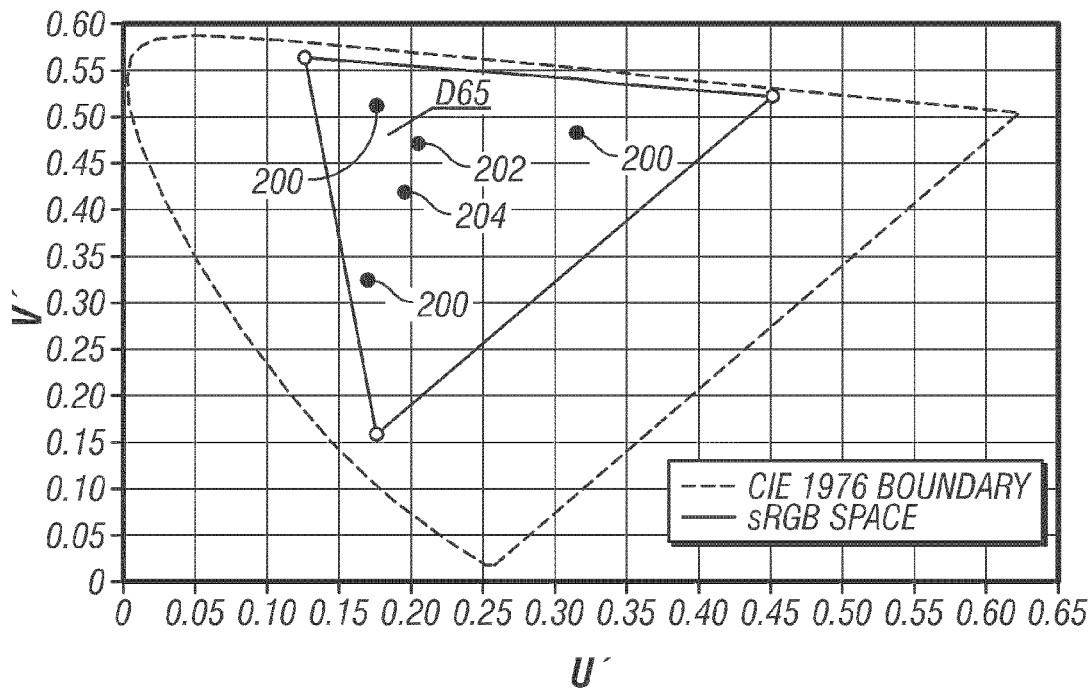
FIG. 11 is a u',v' color space plot depicting final optimized interferometric modulator subpixel colors.

The rate of color change with respect to reflective layer distance was determined for each launch value using equation 2. The resulting rates of color change are plotted as a function of launch value for each subpixel in FIG. 10. The rates of color change with respect to reflective layer distance in the original subpixels correspond to the 50 nm launch value (shown in FIG. 10 by a vertical dashed line at launch=50 nm). It can be seen that for all three subpixels, the rates of color change are not close to local minimums. Thus, to improve color sensitivity, the colors where there was a local minimum in the rate of color change were initially selected for each subpixel. These local minimums 170, 172, and 174 are identified by vertical dashed lines in FIG. 10. The local minimums 170, 172, and 174 correspond the deflection points 160, 162, and 164 in the u',v' color space as indicated by the arrows in FIG. 9. However, the combination of the colors located at the local minimums results in a white point 166 (the intersection of the arrows in FIG. 9) that does not coincide with the desired D65 white point. Accordingly, the colors for each subpixel were varied from those corresponding to the local minimums 170, 172, and 174 until a white point close to D65 white 156 was obtained. The final selected colors are indicated by asterisks 180, 182, and 184 in FIG. 10. It can be seen that although the selected colors 180, 182, and 184 do not coincide exactly with local minimums 170, 172, and 174, they nonetheless result in rates of color change with respect to reflective layer distances that are much lower than the original rates (corresponding to launch=50 nm). FIG. 11 is a color space plot indicating the final subpixel colors 200 along with the resulting white point 202 and black point 204 (all subpixels in a dark state). It can be seen that the white point 202 is substantially close to D65 white.

The color gamut, contrast ratio (CR), and color parameters of the resulting display are indicated in Table 1.

TABLE 1

Display parameters achieved using the optimization method described herein.

| Parameter | White | Black | Red | Green | Blue |
|---|---|---|---|---|---|
| Gamut | 19.994 | 19.994 | 19.994 | 19.994 | 19.994 |
| CR | 11.414 | 1 | 2.962 | 8.291 | 2.161 |
| X | 0.2457 | 0.0232 | 0.09553 | 0.1405 | 0.05602 |
| Y | 0.2523 | 0.0221 | 0.06547 | 0.1833 | 0.04776 |
| Z | 0.2639 | 0.04076 | 0.04779 | 0.1124 | 0.1852 |
| u' | 0.2038 | 0.1946 | 0.313 | 0.1742 | 0.1687 |
| v' | 0.4709 | 0.417 | 0.4826 | 0.5112 | 0.3236 |
| x | 0.3225 | 0.2696 | 0.4575 | 0.3222 | 0.1938 |
| y | 0.3312 | 0.2568 | 0.3136 | 0.4202 | 0.1652 |
| z | 0.3464 | 0.4736 | 0.2289 | 0.2577 | 0.6409 |
| L* | 57.298 | 16.554 | 30.753 | 49.89 | 26.086 |
| a* | 2.559 | 4.73 | 30.953 | −19.662 | 13.181 |
| b* | 1.683 | −10.774 | 10.062 | 19.788 | −38.253 |

The final colors chosen for the subpixels resulted in an increase in color gamut from 11% to 20% but a decrease in brightness from 30% to 25%.

Figure 12A:
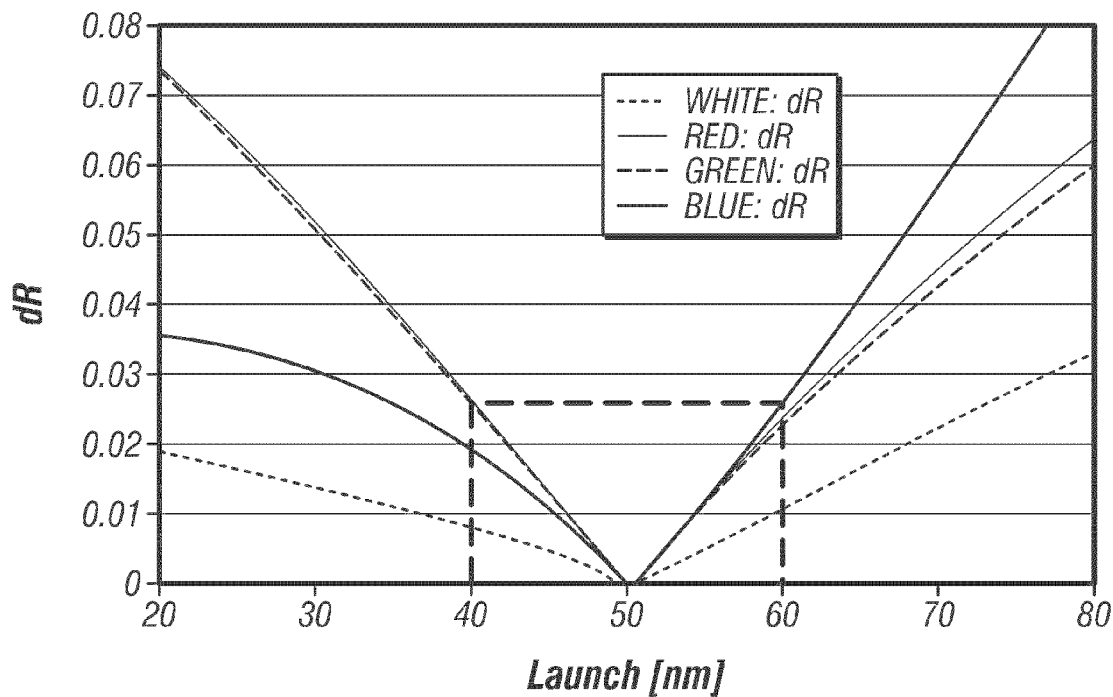
FIG. 12A is a graph depicting color variation as a function of reflective layer distance for an original display design.
Figure 12B:
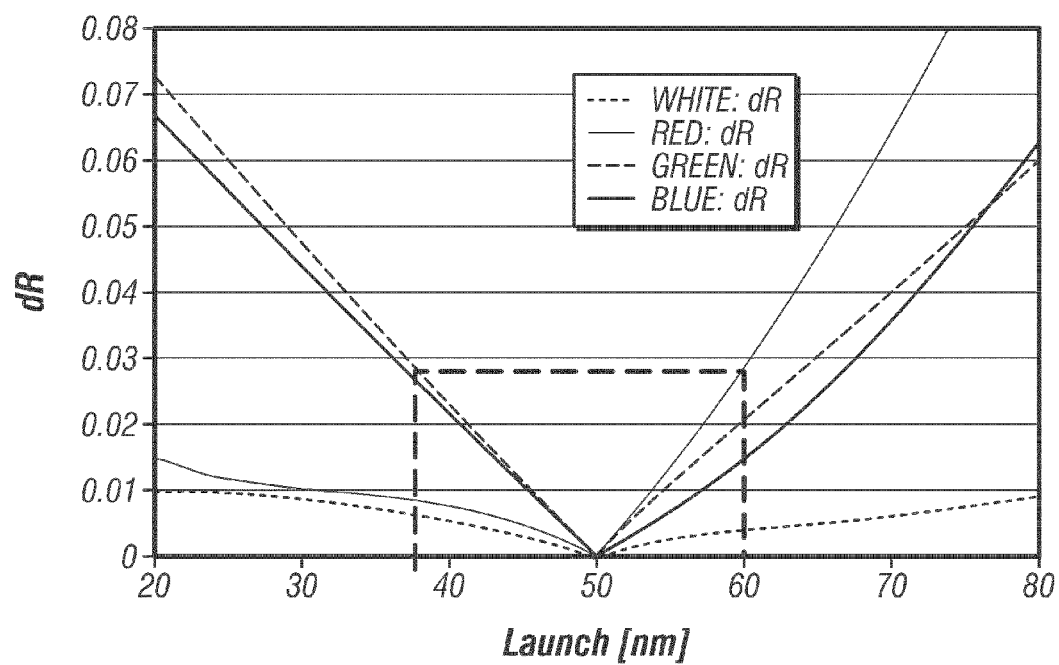
FIG. 12B is a graph depicting color variation as a function of reflective layer distance for an optimized display design.

FIG. 12A is a graph depicting the change in color caused by a deviation of reflective layer distance from the chosen distances for the original design. FIG. 12B is the same graph for the optimized design described above. A launch of 50 nm was defined as corresponding to the chosen distances for both designs. Color deviation (dR) was determined according to equation 1. The results for the red, green, and blue subpixels are plotted separately. The white point variation was determined by combining the resulting red, green, and blue colors algorithmically for the specified deviation. It can be seen that over the entire 60 nm range evaluated, the new design (FIG. 12B) results in a maximum white point deviation of less than 0.01 units while in the original design (FIG. 12A), the maximum white point deviation was more than 0.03 units. The dashed-line rectangles represent the maximum allowable range of variation of the gap of the primary colors, while maintaining dR<0.03.

Although the invention has been described with reference to embodiments and examples, it should be understood that numerous and various modifications can be made without departing from the spirit of the invention. Accordingly, the invention is limited only by the following claims.

What is claimed is:

1. A method of selecting a distance between two reflective surfaces for one or more interferometric modulators for use in a display so that the combination of interferometric modulators of the display reflect a target color, the two reflective surfaces defining an optical cavity of the interferometric modulator, the method comprising:

for each of one or more interferometric modulators, determining a first distance between the two reflective surfaces of the interferometric modulator, wherein the determined first distance is the distance between the two reflective surfaces at which a rate of change of a color reflected from the interferometric modulator as a function of the distance between the two reflective surfaces is a local minimum;

determining a color of light that would be reflected from the display when the distance between the two reflective surfaces are at the determined first distances for each of the interferometric modulators of the display; and for each of one or more of the interferometric modulators, varying the distance between the two reflective surfaces away from the first distance to determine a second distance between the two reflective surfaces, wherein the color of light that would be reflected from the display when the two reflective surfaces of the interferometric modulators are set to the second distances is closer to the target color than when the two reflective surfaces of the interferometric modulators are set to the first distances.

2. The method of claim 1, comprising determining different distances between two reflective surfaces for at least two interferometric modulators in the display.

3. The method of claim 2, wherein three different distances are determined.

4. A method of selecting colors for an interferometric modulator display, the method comprising:

determining a color for at least one interferometric modulator for which the rate of change of the color with respect to distance between reflective surfaces in the interferometric modulator is a local minimum, wherein determining the rate of change of color with respect to distance comprises determining the color difference in u'-v' color space between colors generated for two different reflective surface distances; and varying the color so that a certain color reflected from the display is substantially close to a desired target color, wherein determining the color difference in u'-v' color space comprises determining the value $\sqrt{(u_2'-u_1')^2+(v_2'-v_1')^2}$, and wherein $u_1'$ and $v_1'$ are color parameters corresponding to the first reflective surface distance and $u_2'$ and $v_2'$ are color parameters corresponding to the second reflective surface distance.

5. The method of claim 4, wherein determining the color comprises determining u' and v' color parameters for the interferometric modulator.

6. The method of claim 4, wherein three or more different colors are determined for three or more different interferometric modulators.

7. The method of claim 6, wherein the certain color reflected from the display is generated by reflection from all three or more interferometric modulators.

8. The method of claim 7, wherein the colors for all three or more interferometric modulators are varied so that the certain color reflected from the display is substantially close to the desired target color.

9. The method of claim 6, wherein the three or more different colors include substantially red, substantially green, and substantially blue.

10. The method of claim 6, wherein the three or more different colors include substantially yellow.

11. The method of claim 4, wherein the desired target color is substantially white.

12. The method of claim 11, wherein the desired target color is D65 standard white.

13. The method of claim 4, wherein determining the color comprises modeling the optical response from the interferometric modulator.

14. The method of claim 4, wherein the color is varied less than 0.03 units in u'-v' color space from the color corresponding to the local minimum.

15. A method of selecting colors for an interferometric modulator display, the method comprising:
   determining a color for at least one interferometric modulator for which the rate of change of the color with respect to distance between reflective surfaces in the interferometric modulator is a local minimum, wherein determining the rate of change of color with respect to distance comprises determining the color difference in u'-v' color space between colors generated for two different reflective surface distances; and
   varying the color so that a certain color reflected from the display is substantially close to a desired target color, wherein determining the rate of change of color with respect to distance comprises determining the color difference in u'-v' color space between colors generated for two different reflective surface distances, and wherein the two different reflective surface distances are about 1 nm apart.

16. A method of selecting colors for an interferometric modulator display, the method comprising:
   determining a color for at least one interferometric modulator for which the rate of change of the color with respect to distance between reflective surfaces in the interferometric modulator is a local minimum, wherein determining the color comprises modeling the optical response from the interferometric modulator, and wherein determining the rate of change of color with respect to distance comprises determining the color difference in u'-v' color space between colors generated for two different reflective surface distances; and
   varying the color so that a certain color reflected from the display is substantially close to a desired target color, wherein determining the rate of change of color with respect to distance comprises determining the color difference in u'-v' color space between colors generated for two different reflective surface distances,
   wherein the optical model includes one or more thickness of a material layer in the interferometric modulator, one or more refractive index of a material layer in the interferometric modulator, and one or more extinction coefficient of a material layer in the interferometric modulator.

17. A computer-readable medium comprising computer-executable instructions for performing the method comprising:
   determining a color for at least one interferometric modulator for which the rate of change of the color with respect to distance between reflective surfaces in the interferometric modulator is a local minimum, wherein determining the rate of change of color with respect to distance comprises determining the color difference in u'-v' color space between colors generated for two different reflective surface distances; and
   varying the color so that a certain color reflected from the display is substantially close to a desired target color; wherein determining the color difference in u'-v' color space comprises determining the value $\sqrt{(u_2'-u_1')^2+(v_2'-v_1')_2}$, and wherein $u_1'$ and $v_1'$ are color parameters corresponding to the first reflective surface distance and $u_2'$ and $v_2'$ are color parameters corresponding to the second reflective surface distance.

18. The computer-readable medium of claim 17, wherein the medium comprises a computer hard disk.

19. The computer-readable medium of claim 17, wherein the medium comprises an optically read disk.

20. The computer-readable medium of claim 17, comprising computer-executable instructions for determining u' and v' color parameters for the interferometric modulator.

21. The computer-readable medium of claim 17, comprising computer-executable instructions for determining three or more different colors for three or more different interferometric modulators.

22. The computer-readable medium of claim 21, comprising computer-executable instructions for varying the colors for all three or more interferometric modulators so that the certain color reflected from the display is substantially close to the desired target color.

23. The computer-readable medium of claim 17, comprising computer-executable instructions for determining the color difference in u'-v' color space between colors generated for two different reflective surface distances.

24. A method of manufacturing an interferometric modulator display, each interferometric modulator including two reflective surfaces defining an optical cavity, the method comprising:
   selecting distances between reflective surfaces in each interferometric modulator of the display so that a combination of interferometric modulators of the display reflect a target color, wherein the distances are selected by:
      for each of one or more interferometric modulators, determining a first distance between two reflective surfaces of the interferometric modulator, wherein the determined first distance is the distance between the two reflective surfaces at which a rate of change of a color reflected from the interferometric modulator as a function of the distance between the two reflective surfaces is a local minimum;
      determining a color of light that would be reflected from the display when the distance between the two reflective surfaces are at the determined first distances for each of the interferometric modulators of the display;
      for each of one or more of the interferometric modulators, varying the distance between the two reflective surfaces away from the first distance to determine a second distance between the two reflective surfaces, wherein the color of light that would be reflected from the display when the two reflective surfaces of the interferometric modulators are set to the second distances is closer to the desired target color than when the two reflective surfaces of the interferometric modulators are set to the first distances; and
   manufacturing an array of interferometric modulators having the selected distances.

25. An interferometric modulator display, comprising at least one interferometric modulator having a bright state color within 0.04 units in u'-v' color space of a color at which the rate of change of color with respect to distance between reflective surfaces in the interferometric modulator is a local minimum,
   wherein determining the rate of change of color with respect to distance comprises determining the color difference in u'-v' color space between colors generated for two different reflective surface distances, and
   wherein determining the color difference in u'-v' color space comprises determining the value $\sqrt{(u_2'-u_1')^2+(v_2'-v_1')_2}$, and wherein $u_1'$ and $v_1'$ are color parameters corresponding to the first reflective surface distance and $u_2'$ and $v_2'$ are color parameters corresponding to the second reflective surface distance.

26. The display of claim 25, wherein the interferometric modulator has a bright state color within 0.03 units in u'-v' color space of the color at which the rate of change of color with respect to distance between reflective surfaces in the interferometric modulator is a local minimum.

27. The display of claim 25, wherein the interferometric modulator has a bright state color within 0.02 units in u'-v' color space of the color at which the rate of change of color with respect to distance between reflective surfaces in the interferometric modulator is a local minimum.

28. The display of claim 25, wherein a plurality of interferometric modulators in the display have a bright state color within 0.04 units in u'-v' color space of a color at which the rate of change of color with respect to distance between reflective surfaces in the interferometric modulators is a local minimum.

29. The display of claim 25, comprising:
a first set of interferometric modulators having a bright state color within 0.04 units in u'-v' color space of a first color at which the rate of change of color with respect to distance between reflective surfaces in the first set of interferometric modulators is a local minimum;
a second set of interferometric modulators having a bright state color within 0.04 units in u'-v' color space of a second color at which the rate of change of color with respect to distance between reflective surfaces in the second set of interferometric modulators is a local minimum; and
a third set of interferometric modulators having a bright state color within 0.04 units in u'-v' color space of a third color at which the rate of change of color with respect to distance between reflective surfaces in the third set of interferometric modulators is a local minimum.

30. The display of claim 29, wherein the first color is substantially red, the second color is substantially green, and the third color is substantially blue.

31. The display of claim 25, further comprising:
a processor that is in electrical communication with the interferometric modulator, said processor being configured to process image data; and
a memory device in electrical communication with said processor.

32. The display of claim 31, further comprising:
a first controller configured to send at least one signal to the interferometric modulator; and
a second controller configured to send at least a portion of said image data to said first controller.

33. The display of claim 31, further comprising an input device configured to receive input data and to communicate said input data to said processor.

34. The display of claim 31, further comprising an image source module configured to send said image data to said processor.

35. The display of claim 34, wherein said image source module comprises at least one of a receiver, transceiver, and transmitter.

36. A display, comprising:
first means for reflecting light; and
second means for reflecting light, wherein the distance between the first and second means is such that light interferometrically reflected from the first and second means has a color within 0.04 units in u'-v' color space of a color at which the rate of change of color with respect to distance between the first and second means is a local minimum,
wherein determining the rate of change of color with respect to distance comprises determining the color difference in u'-v' color space between colors generated for two different distances between the first light reflecting means and the second light reflecting means, and
wherein determining the color difference in u'-v' color space comprises determining the value $\sqrt{(u_2'-u_1')^2+(v_2'-v_1')_2}$, and wherein $u_1'$ and $v_1'$ are color parameters corresponding to the light reflected when the first and second light reflecting means are separated by the first distance and $u_2'$ and $v_2'$ are color parameters corresponding to the light reflected when the first and second light reflecting means are separated by the second distance.

37. The display of claim 36, wherein the first means comprises a partially reflective surface.

38. The display of claim 36 or 37, wherein the second means comprises a reflective surface.

39. The display of claim 38, wherein the reflective surface is movable.

40. An interferometric modulator display, comprising at least one interferometric modulator having a bright state color that varies less than about 0.03 units in u'-v' color space over a 20° C. temperature change, wherein the varying units of the bright state color is determined by a bright state color difference in u'-v' color space between colors generated for two different temperatures using the value $\sqrt{(u'_2-u'_1)^2+(v'_2-v'_1)^2}$; and wherein $u'_1$ and $v'_1$ are color parameters corresponding to the light reflected from the interferometric modulator at a first temperature and $u'_2$ and $v'_2$ are color parameters corresponding to the light reflected from the interferometric modulator are at a second temperature.

41. The display of claim 40, wherein the bright state color varies less than about 0.02 units in u'-v' color space over a 20° C. temperature change.

42. The display of claim 40, wherein the bright state color varies less than about 0.01 units in u'-v' color space over a 20° C. temperature change.

43. The display of claim 40, wherein a plurality of interferometric modulators in the display have a bright state color that varies less than about 0.02 units in u'-v' color space over a 20° C. temperature change.

* * * * *